Dec. 17, 1935.  S. O. BURG  2,024,623

COMBINATION ROTARY DISK PLOW PULVERIZER

Filed March 11, 1935

Inventor:
Swan O. Burg

Patented Dec. 17, 1935

2,024,623

UNITED STATES PATENT OFFICE 2,024,623

COMBINATION ROTARY DISK-PLOW PULVERIZER

Swan O. Burg, Tampa, Fla.

Application March 11, 1935, Serial No. 10,369

1 Claim. (Cl. 97—217)

The prime object of this invention is to provide a combination disk that will do the work of the plow, disk harrow and lump crusher in one operation and do better work than all combined, of which the following is a specification:

The disk being constructed with a plural number of radially arranged blades or teeth which are sharpened at the edges and pointed at the ends and made in one solid unit or combination disk.

Figure 1:
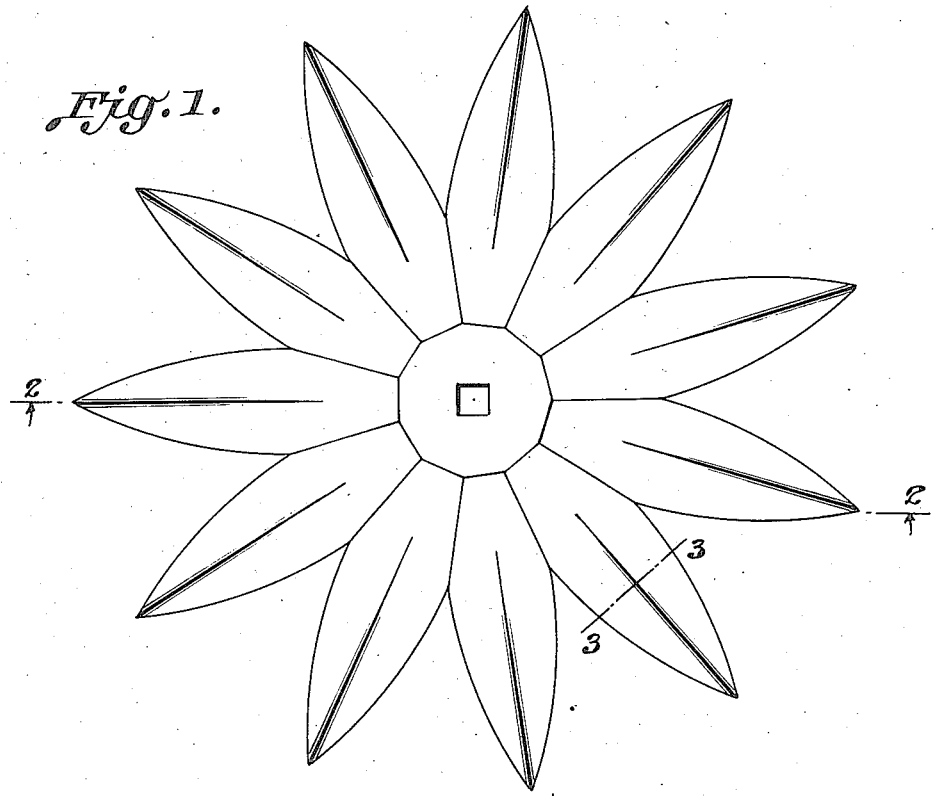
Figure 2:
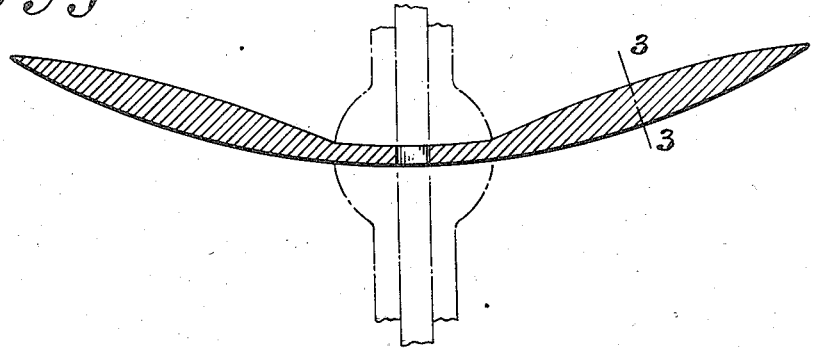
Figure 3:

I attain these objects by the device illustrated in the accompanying drawing in which—, Figure 1 is a face view of the disk; Fig. 2 is a central transverse sectional view on line 2—2, Fig. 1; Fig. 3 is a transverse sectional view of one of the teeth on line 3—3, Fig. 1, and line 3—3, Fig. 2.

Specifically describing the invention: Disk 1 is made in suitable thickness and dimensions. The teeth or blades are sharp at the edges so as to cut the sod, and sharply pointed at the ends so as to go deep into the ground and pulverize the soil; and are solid transversely oblong-convex and angular shaped, to keep from bending or breaking.

These disks are specially so constructed that they are interchangeable on any ordinary disk harrow frame, by removing the round or cutaway disks and replacing them with the disk-plow pulverizers.

I claim:

Improvement in a combination disk-plow pulverizer with transversely solid oblong-convex and angular shaped teeth.

SWAN O. BURG.